{12} United States Patent
Soncodi et al.

(10) Patent No.: US 8,213,299 B2
(45) Date of Patent: Jul. 3, 2012

(54) METHODS AND SYSTEMS FOR LOCATING REDUNDANT TELEPHONY CALL PROCESSING HOSTS IN GEOGRAPHICALLY SEPARATE LOCATIONS

(75) Inventors: Adrian C. Soncodi, Plano, TX (US);
Robby D. Benedyk, Raleigh, NC (US);
Richard R. Barbour, Plano, TX (US)

(73) Assignee: Genband US LLC, Plano, TX (US)

( * ) Notice: Subject to any disclaimer, the term of this patent is extended or adjusted under 35 U.S.C. 154(b) by 1218 days.

(21) Appl. No.: 10/666,217

(22) Filed: Sep. 18, 2003

(65) Prior Publication Data
US 2004/0114578 A1 Jun. 17, 2004

Related U.S. Application Data

(60) Provisional application No. 60/412,513, filed on Sep. 20, 2002.

(51) Int. Cl.
*G01R 31/08* (2006.01)
(52) U.S. Cl. ...................................................... 370/218
(58) Field of Classification Search .......... 370/216–218, 370/400–401
See application file for complete search history.

(56) References Cited

U.S. PATENT DOCUMENTS

| | | | |
|---|---|---|---|
| 4,993,014 A * | 2/1991 | Gordon | 370/225 |
| 5,796,934 A | 8/1998 | Bhanot et al. | |
| 5,987,524 A | 11/1999 | Yoshida et al. | |
| 6,014,753 A | 1/2000 | Miyamoto et al. | |
| 6,044,405 A | 3/2000 | Driscoll, III et al. | |
| 6,088,328 A | 7/2000 | McKnight | |
| 6,111,893 A | 8/2000 | Volftsun et al. | |
| H1859 H | 9/2000 | Asthana et al. | |
| 6,118,779 A | 9/2000 | Madonna | |
| 6,122,363 A | 9/2000 | Friedlander et al. | |
| 6,125,111 A | 9/2000 | Snow et al. | |
| 6,202,169 B1 | 3/2001 | Razzaghe-Ashrafi et al. | |
| 6,230,281 B1 | 5/2001 | Brodfuhrer et al. | |
| 6,308,282 B1 * | 10/2001 | Huang et al. | 714/4 |
| 6,339,594 B1 | 1/2002 | Civanlar et al. | |
| 6,385,193 B1 | 5/2002 | Civanlar et al. | |
| 6,470,389 B1 | 10/2002 | Chung et al. | |
| 6,496,949 B1 | 12/2002 | Kanevsky et al. | |
| 6,563,835 B1 | 5/2003 | Chen | |
| 6,563,918 B1 | 5/2003 | Nelson et al. | |
| 6,640,251 B1 * | 10/2003 | Wiget et al. | 709/238 |
| 6,731,678 B1 * | 5/2004 | White et al. | 375/219 |
| 6,751,191 B1 | 6/2004 | Kanekar et al. | |

(Continued)

OTHER PUBLICATIONS

Simeonov et al., "@INGate: A Distributed Intelligent Network Approach to Bridge Switching and Packet Networks," Technical University Berlin, XP-002073675, pp. 358-363 (1997).

(Continued)

*Primary Examiner* — Kevin C Harper
(74) *Attorney, Agent, or Firm* — Jenkins, Wilson, Taylor & Hunt, P.A.

(57) ABSTRACT

Methods and systems for providing redundant telephony call processing in geographically separate locations are disclosed. First and second telephony call processing hosts are provided in first and second geographic locations separated from each other. The telephony call processing hosts are located on the same LAN, which is also divided among the geographically separated locations. The geographically separate LAN or LANs are bridged using either a customer's IP network or isolation routers associated with the redundant telephony call processing hosts.

16 Claims, 14 Drawing Sheets

U.S. PATENT DOCUMENTS

| | | | |
|---|---|---|---|
| 6,958,988 | B1 | 10/2005 | Okagawa et al. |
| 6,976,087 | B1 * | 12/2005 | Westfall et al. ............... 709/238 |
| 7,181,642 | B1 | 2/2007 | Heideman et al. |
| 7,286,545 | B1 * | 10/2007 | Tester et al. ................... 370/401 |
| 7,370,099 | B2 | 5/2008 | Hara et al. |
| 2001/0046234 | A1 | 11/2001 | Agrawal et al. |
| 2001/0048686 | A1 | 12/2001 | Takeda et al. |
| 2001/0055375 | A1 | 12/2001 | Capers et al. |
| 2002/0027983 | A1 | 3/2002 | Suzuki |
| 2002/0071543 | A1 | 6/2002 | Williams |
| 2002/0073288 | A1 | 6/2002 | Jeong |
| 2002/0089940 | A1 | 7/2002 | Lee |
| 2002/0097670 | A1 | 7/2002 | Struhsaker et al. |
| 2002/0107966 | A1 | 8/2002 | Baudot et al. |
| 2002/0141352 | A1 | 10/2002 | Fangman et al. |
| 2002/0160810 | A1 * | 10/2002 | Glitho et al. ................... 455/560 |
| 2002/0165972 | A1 * | 11/2002 | Chien et al. .................... 709/229 |
| 2002/0191616 | A1 * | 12/2002 | Sarmiento et al. ............ 370/400 |
| 2003/0005350 | A1 | 1/2003 | Koning et al. |
| 2003/0172093 | A1 | 9/2003 | Nagoya |
| 2003/0212794 | A1 | 11/2003 | Touati et al. |
| 2004/0063499 | A1 * | 4/2004 | Schneider et al. ............... 463/42 |
| 2004/0153709 | A1 | 8/2004 | Burton-Krahn |
| 2004/0249960 | A1 | 12/2004 | Hardy et al. |
| 2004/0250173 | A1 | 12/2004 | Jiang et al. |
| 2005/0025179 | A1 | 2/2005 | McLaggan et al. |
| 2005/0058061 | A1 * | 3/2005 | Shaffer et al. ................. 370/216 |
| 2005/0265354 | A1 | 12/2005 | Ryu |
| 2006/0271811 | A1 | 11/2006 | Horton et al. |
| 2006/0271812 | A1 | 11/2006 | Horton et al. |
| 2006/0271813 | A1 | 11/2006 | Horton et al. |
| 2007/0140109 | A1 | 6/2007 | Lobig et al. |
| 2007/0294563 | A1 | 12/2007 | Bose |
| 2008/0014961 | A1 | 1/2008 | Lipps et al. |
| 2008/0034112 | A1 | 2/2008 | Imai et al. |
| 2008/0285436 | A1 | 11/2008 | Robinson |

OTHER PUBLICATIONS

Handley et al., "SIP: Session Initiation Protocol," The Internet Society, RFC 2543, pp. 1-110 (Mar. 1999).

Polyzois et al., "From POTS to PANS: A Commentary on the Evolution to Internet Telephony," IEEE Network, XP-000870632, pp. 58-64 (May/Jun. 1999).

Huitema et al., "An Architecture for Residential Internet Telephony Service," IEEE Internet Computing, XP-002144528, pp. 73-77 (May/Jun. 1999).

Arango et al., "Media Gateway Control Protocol (MCGP)," The Internet Society, RFC 2705, pp. 1-124 (Oct. 1999).

Official Action for European Application No. 03 759 387.8-2414 (Jan. 3, 2008).

Communication pursuant to Article 94(3) EPC for European Application No. 03759387.8 (Mar. 19, 2010).

Communication pursuant to Article 94(3) EPC for European Application No. 03 759 387.8 (Jun. 24, 2011).

Non-Final Official Action for U.S. Appl. No. 11/803,681 (Oct. 27, 2010).

Final Official Action for U.S. Appl. No. 11/803,681 (Mar. 9, 2010).

Interview Summary for U.S. Appl. No. 11/803,681 (Dec. 16, 2009).

Non-Final Official Action for U.S. Appl. No. 11/803,681 (Jun. 17, 2009).

Notification of European Publication Number and Information on the Application of Article 67(3) EPC for European Patent No. 1550255 (May 25, 2005).

Communication pursuant to Rules 109 and 110 EPC for European Application No. 03759387.8 (May 4, 2005).

Notification of Transmittal of the International Search Report or the Declaration for International Application No. PCT/US03/29825 (Mar. 1, 2004).

Notice of Allowance and Fee(s) Due for U.S. Appl. No. 11/803,681 (Mar. 28, 2011).

Interview Summary for U.S. Appl. No. 11/803,681 (Mar. 4, 2011).

* cited by examiner

METHODS AND SYSTEMS FOR LOCATING REDUNDANT TELEPHONY CALL PROCESSING HOSTS IN GEOGRAPHICALLY SEPARATE LOCATIONS

RELATED APPLICATIONS

This application claims the benefit of U.S. Provisional Patent Application Ser. No. 60/412,513, filed Sep. 20, 2002, the disclosure of which is incorporated herein by reference in its entirety.

TECHNICAL FIELD

The present invention relates to methods and systems for locating redundant telephony call processing hosts, such as redundant media gateway controllers and redundant SIP proxy servers, in geographically diverse locations.

BACKGROUND ART

Active and standby configurations are often used in telecommunications networks to increase network reliability by reducing the likelihood that failure of one device will disable communications in the network. IP telephony call processing hosts, such as media gateway controllers, have been deployed in redundant pairs. However, these redundant pairs are often located in the same physical frame, making the active and standby host susceptible to simultaneous failure due to a power outage, fire, or other occurrence at the site where the physical frame is located.

As used herein, the term "telephony call processing host" refers to a physical entity in a telephony network, and the term "telephony call processing node" refers to a logical entity in a telephony call processing network. A node may include two or more physical hosts, where the hosts are located in the same or in different geographic locations. When a node consists of two redundant hosts, each host may also be referred to as a half-node.

For simplicity, the present invention will be described in terms of nodes consisting of two hosts. However, the methods and systems described herein may be applied to N hosts, where N may be greater than two.

In conventional telecommunication systems, media gateway controllers were redundantly deployed at single locations, but not at geographically diverse locations. Providing redundancy at geographically diverse locations introduces problems because communicating state information in a manner sufficient to enable reliable switchover is problematic when the hosts are located in remote locations.

Accordingly, there exists a need for improved methods and systems for providing redundant telephony call processing hosts at geographically diverse locations.

DISCLOSURE OF THE INVENTION

According to one aspect of the invention, a dual-host telephony call processing system includes one active and one standby host. In case of a hardware or software failure, a switchover occurs and the two hosts switch roles. Prior to the present invention, telephony call processing hosts were deployed in the same physical frame, at the same location. Therefore, this solution did not offer redundancy for a complete site failure, for example an earthquake that affects a building. The typical solution for providing site redundancy was to use two multi-host nodes, one at each site. But this has several disadvantages: it doubles the cost of the solution, and it also complicates the network topology (provisioning and maintenance).

To provide for site redundancy, two telephony call processing hosts may now be deployed in two different frames, located at different sites. This can be done using the same application software that the telephony call processing hosts normally uses; however, some aspects of the network architecture (topology), as well as the network configuration, are different in a multi-site solution.

In a site-redundant configuration, half of the telephony call processing equipment is located at one site and the other half is located at another site (e.g. in two different buildings or even in two different cities). This includes distributing a call processing node (two physical hosts) between the sites and exchanging state information from one of the telephony call processing hosts to the other telephony call processing host. If any site suffers a complete failure, one of the two LANs is still available for communications. Two LAN switches are required to provide redundant LANs at each site. Also, two routers are required so that both telephony call processing hosts have redundant connections to the service provider's network.

Interconnecting the LAN segments is relatively simple to do when the two sites are in two locations that are close enough to each other. In this case, an extended LAN connection can be provided. If the two sites are located far away from each other, possibly in different cities, then the interconnections must be provided over WAN links. This solution involves transparent LAN bridging over a WAN, which is the technique of interconnecting LAN segments over a WAN such that, together, they still form a single IP subnet (the same LAN). With the introduction of site redundancy, a new, standardized IP addressing scheme has been implemented. This scheme is consistent for either the normal or site redundant configuration. The scheme is flexible in that it can fit into an existing customer network, as long as two blocks of IP addresses can be allocated to the telephony call processing host components.

An additional feature of the invention is the ability to provide additional redundancy by adding a half system (single host). In a network where multiple nodes are present (for example, N dual-hosts, i.e. 2N hosts), splitting nodes between sites has the benefit of if a site fails (e.g., due to a natural disaster), service can be preserved. This means that one can use only 2N hosts instead of the 4N hosts that would be required if dual hosts are provisioned at each node. However, a disadvantage of using one host in each geographically separated site is that repairing the failed site can take a long time, during which the remaining host runs in simplex mode, where it is vulnerable to normal hardware/software failures. To overcome this problem, one implementation of the invention includes adding an additional half-system (one host) that can take over the role of any other failed host in the system, at any time. Adding a half-node at one site provides the benefits of a 4N-hosts full redundant solution, but uses only 2N+1 hosts. For example, if a system has N=1 dual host or 2 single hosts and a second backup host that can take over for either of the single hosts, the system has the same reliability with regard to site outage as a system with 2 dual hosts in separate locations. Given that these systems are expensive, sometimes costing millions or tens of millions of dollars, this represents a substantial savings.

The site redundancy concept can be extended to any telephony call processing node, such as a SIP proxy server, an H.323 gatekeeper, a telephony feature server that terminates the media stream and provides telephony services, such as call waiting or call forwarding, or a telephony application server that provides database-related telephony services, such as number portability. Providing multi-site redundancy between any types of IP telephony call processing hosts is intended to be with the scope of the invention.

Accordingly, it is an object of the invention to provide methods and systems for distributing a telephony call processing node among geographically separate locations.

It is another object of the invention to provide methods for addressing signaling messages to a geographically distributed telephony call processing host that avoid the need to reconfigure backbone routers.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
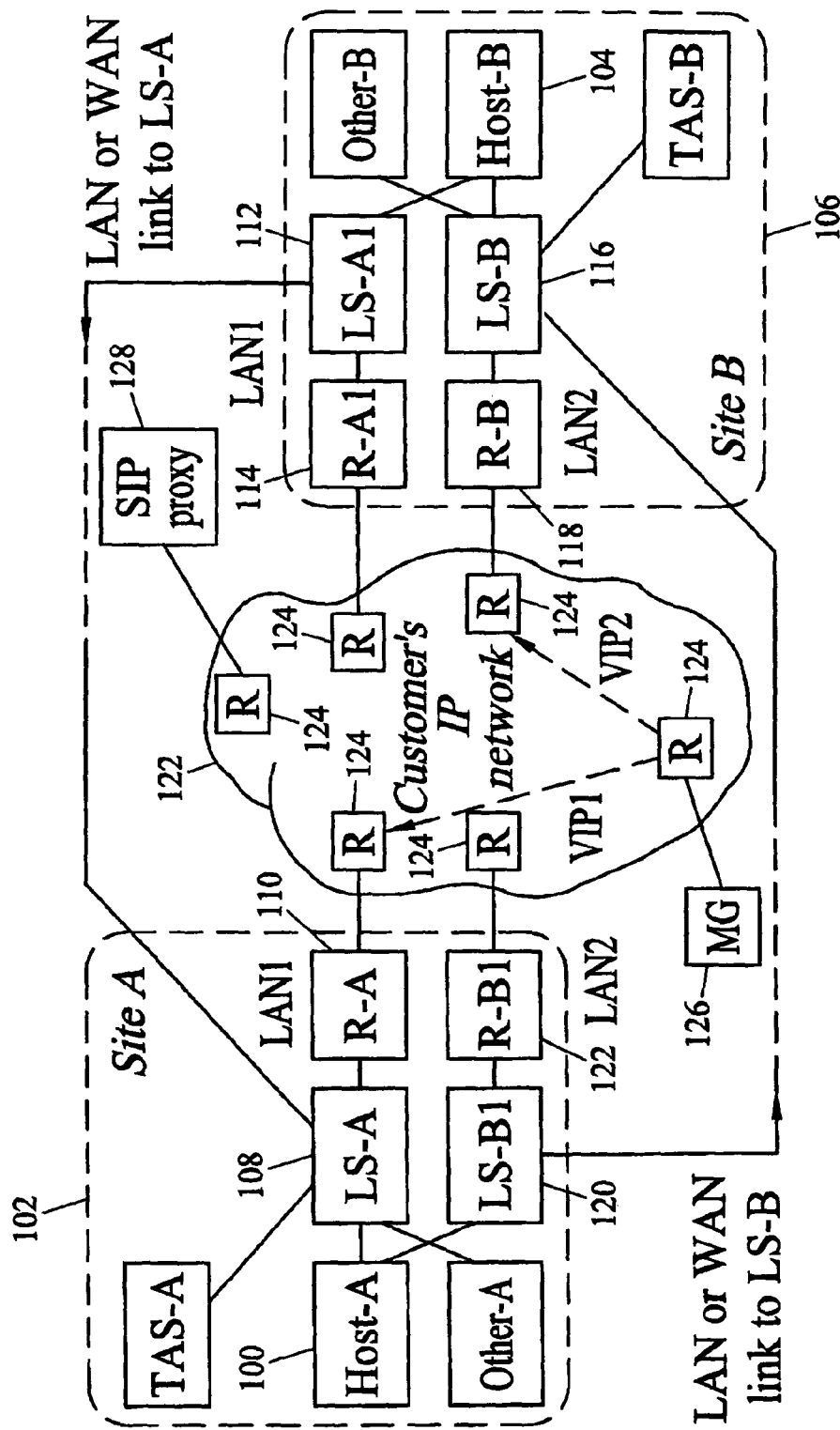
FIG. 1 is a block diagram of an exemplary network architecture for providing geographically separate redundant telephony call processing according to an embodiment of the present invention.

The present invention includes geographically separate redundant telephony call processing hosts and a novel addressing scheme that eliminates the need to update routing tables in an interconnecting customer network. FIG. 1 illustrates an exemplary network architecture for providing geographically separate redundant telephony call processing hosts according to an embodiment of the present invention. In FIG. 1, a first telephony call processing host 100 resides at site A 102 and a second telephony call processing host 104 resides at site B 106. Telephony call processing hosts 100 and 104 may be any type of packet telephony call processing hosts, such as media gateway controllers, SIP proxy servers, H.323 gate keepers, etc. Other equipment performing collateral telephony functions (such as Tones and Announcement Servers—TAS) may also be distributed between sites. Sites 102 and 106 may be separated by any suitable geographic distance to ensure site redundancy so that a natural disaster at one site has a reduced likelihood of affecting the other site.

In order to provide a high-speed, redundant interconnection between hosts 100 and 104, hosts 100 and 104 are interconnected via two LANs, LAN 1 and LAN 2 bridged over a WAN. In the illustrated embodiment, both LAN 1 and LAN 2 are distributed between site A 102 and site B 106. That is, LAN 1 has a first side located at site A and a second side located at site B. Similarly, LAN 2 has a first side located at site A and a second side located at site B. A novel subnetting scheme that allows routers to distinguish between the LAN and side for each LAN/side illustrated in FIG. 1 will be described in detail below.

Communication from site A 102 to site B 106 via LAN 1 occurs using LAN switch A 108, router A 110, LAN switch A1 112, and router A1 114. Similarly, communication between site A 102 and site B 106 via LAN B occurs via LAN switch B 116, router B 118, LAN switch B1 120, and router B1 122.

Also shown in FIG. 1 is a customer's interconnecting IP network 122 including a plurality of routers 124, a media gateway 126, and a SIP proxy server 128. As will be described in more detail below, one method for interconnecting site A and site B according to the present invention reduces the need to update the routing tables in each of the routers 124.

Figure 2:
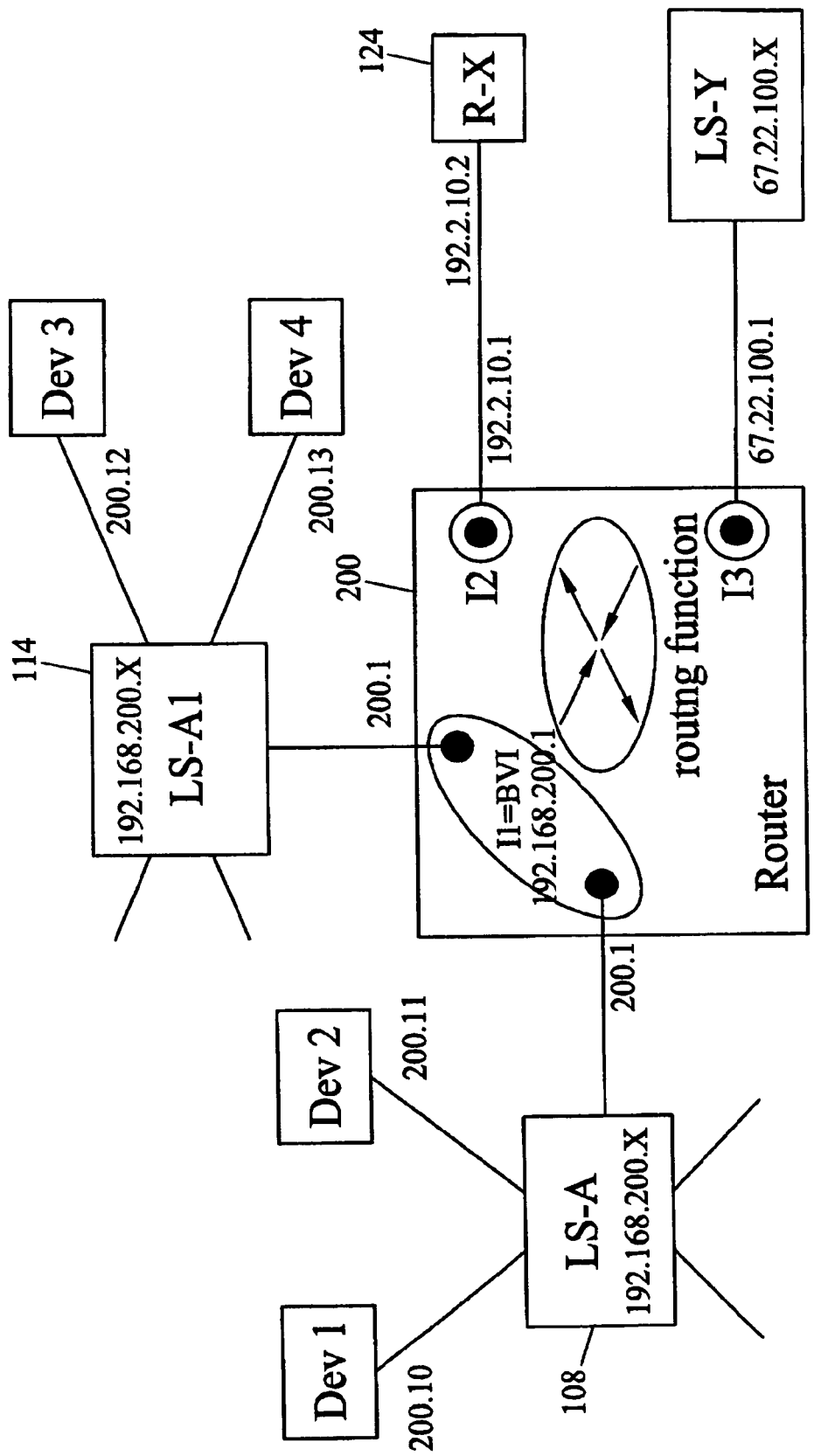
FIG. 2 is a block diagram illustrating LAN bridging suitable for interconnecting geographically separate redundant telephony call processing hosts according to an embodiment of the present invention.

In one exemplary implementation, interconnection between redundant telephony call processing sites can be implemented using transparent LAN bridging over a WAN. FIG. 2 illustrates exemplary configuration of a router in the interconnecting WAN for transparent LAN bridging using a bridge virtual interface (BVI) group. Normally, a router cannot have more than one interface connected to the same LAN, i.e., with the same IP address and subnet mask. However, if these interfaces connect to different segments of the same LAN, they can be interconnected and declared part of the same bridge virtual interface group. A bridge virtual interface group is a collection of interfaces on a router which together act as a single interface connected to a single subnet. For IP routing purposes, the interfaces in the BVI group share a single subnet address mask that corresponds to the virtual subnet (LAN) consisting of several segments.

Referring to FIG. 2, a router 200 includes three interfaces, I1, I2, and I3. The routing function in router 200 delivers IP packets between the interfaces based on the destination IP address. When an IP packet is delivered to I1, which is a BVI, the bridging function determines to which physical interface within the bridge it must deliver the packet. To support this, the bridging function maintains an internal ARP table associated with the BVI, which specify the IP addresses that have been associated with the MAC addresses via ARP broadcast. The ARP table also indicates which physical interface within the BVI the ARP broadcast has been received.

In FIG. 2, the bridge virtual interface interconnects LAN switch A 108 and LAN switch A1 114. LAN switch A 108 and LAN switch A1 114 are on the same subnet 200.1 but are connected to different interfaces on router 200. The bridge virtual interface feature of router 200 enables such interconnection to occur.

Figure 3:
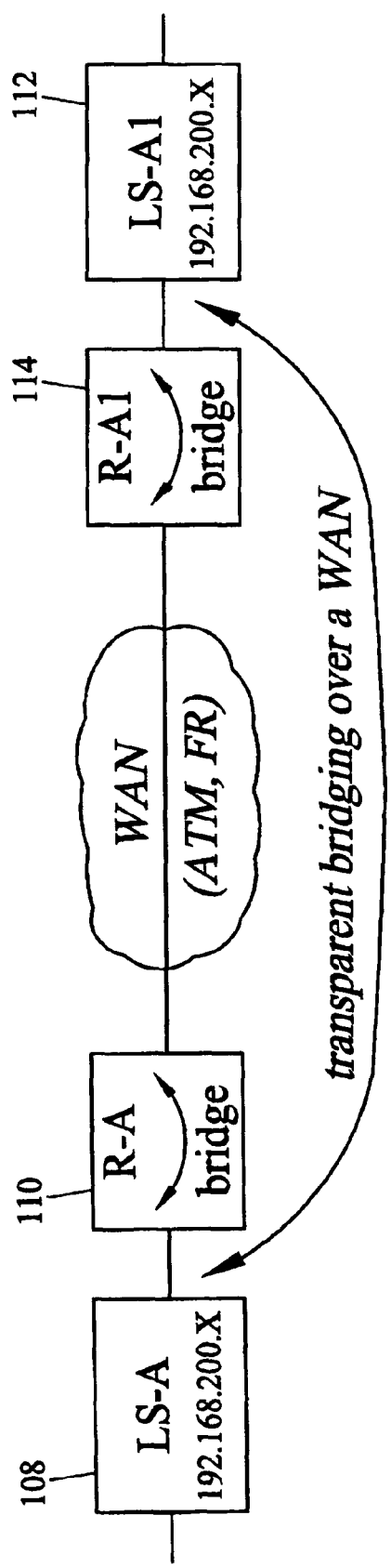
FIG. 3 is a block diagram illustrating transparent LAN bridging over a WAN suitable for communicating between geographically separate redundant telephony call processing hosts according to an embodiment of the present invention.

While FIG. 2 illustrates bridging between geographically separate subnets using a single router, in most situations, the interfaces that need to be bridged are located remotely from each other. Therefore, bridging over a WAN is required. FIG. 3 illustrates a generic solution for transparent LAN bridging over a WAN. In FIG. 3, LAN switches LAN switch A 108 and LAN switch A1 112 need to be bridged. The bridging is performed by router A 110 and router A1 114. Exemplary protocols for performing the WAN bridging will be described in more detail below.

Depending on the facilities within the interconnecting IP network, redundant telephony call processing hosts can be bridged in a number of different manners. Three methods for bridging between geographically separate redundant telephony call processing hosts will now be described in detail. The first two methods use the interconnecting or customer equipment. The third method uses the isolation routers.

Bridging Performed in Interconnecting Customer Equipment (Variant 1)

Figure 4:
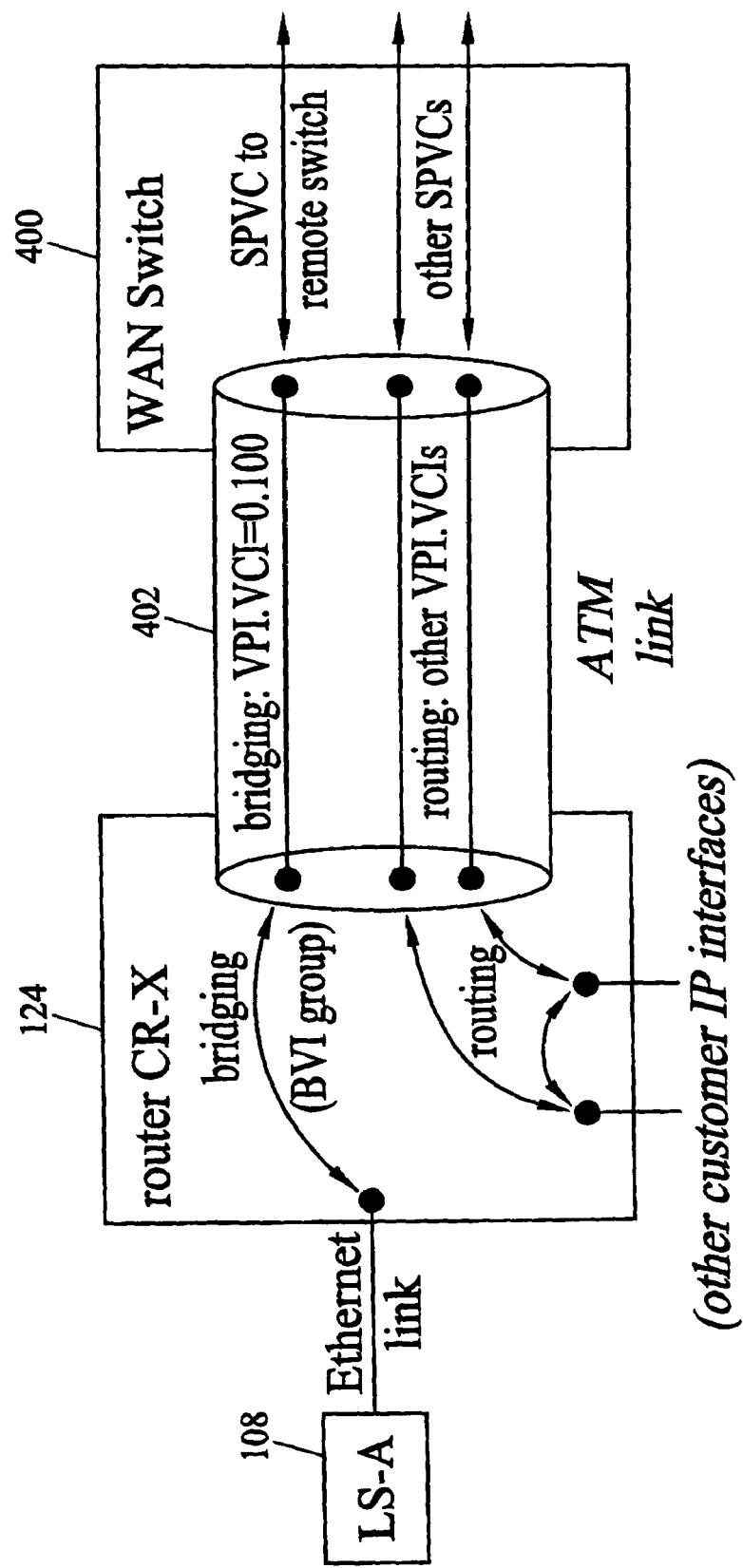
FIG. 4 is a block diagram illustrating Ethernet to ATM bridging in a WAN access router at one host of a pair of geographically separate redundant telephony call processing hosts according to an embodiment of the present invention.

FIG. 4 illustrates exemplary bridging performed by a customer router 124 and customer WAN switch 400. In FIG. 4, IP traffic that needs to be bridged from LAN switch A 108 enters router 124 over an Ethernet interface. Router 124 has a WAN interface, such as a point-to-point ATM link, to switch 400, which is the first switch in the WAN. Bridging is performed over a dedicated permanent virtual circuit (PVC) on the ATM link. The permanent virtual circuit will be defined by a VPI.VCI value, such as 0.100, shown in FIG. 4. The Ethernet interface from LAN switch A 108 and the ATM PVC used for bridging must be part of the same bridge virtual interface group.

Figure 5:
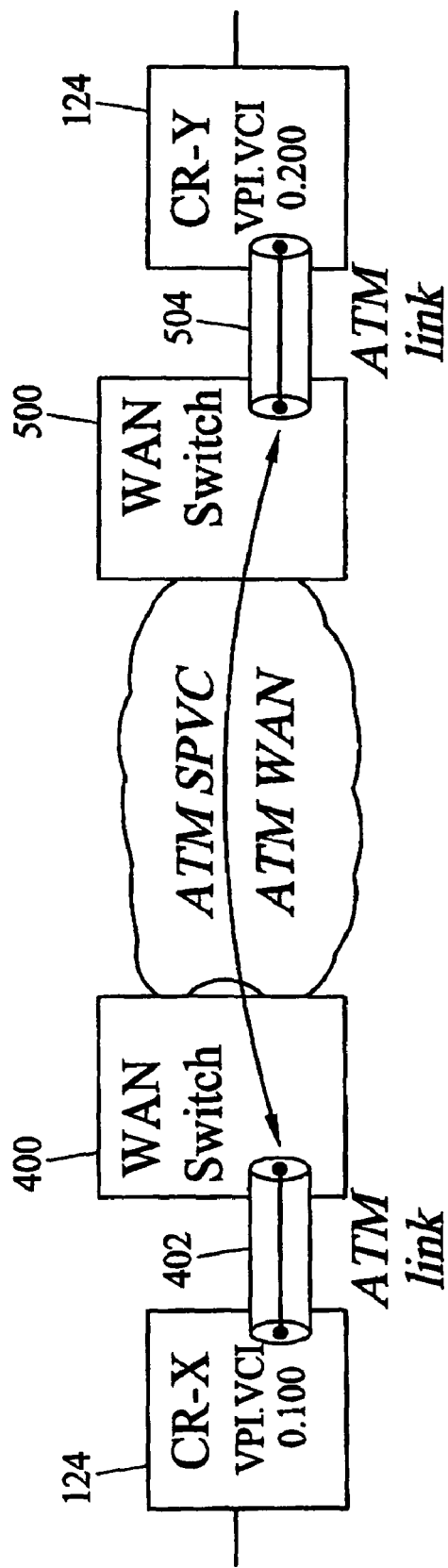
FIG. 5 is a block diagram illustrating exemplary ATM switched permanent virtual circuit bridging between geographically separate redundant telephony call processing hosts according to an embodiment of the present invention.

On the WAN switch, bridged traffic incoming on VPI.VCI 01.100 must be relayed over the WAN to the switch connected to the customer router on the remote end of the connection. FIG. 5 illustrates both ends of the connection corresponding to the diagram in FIG. 4. In FIG. 5, the remote end of the connection consists of a WAN switch 500, a customer router CR-X 124, and an ATM link 504 interconnecting WAN switch 500 and CR-Y 124. A similar BVI group may be used at the remote end of the connection to interconnect the LAN segments. The WAN switches may be interconnected by an ATM PVC or SPVC, depending on the particular ATM switching equipment used.

Figure 6:
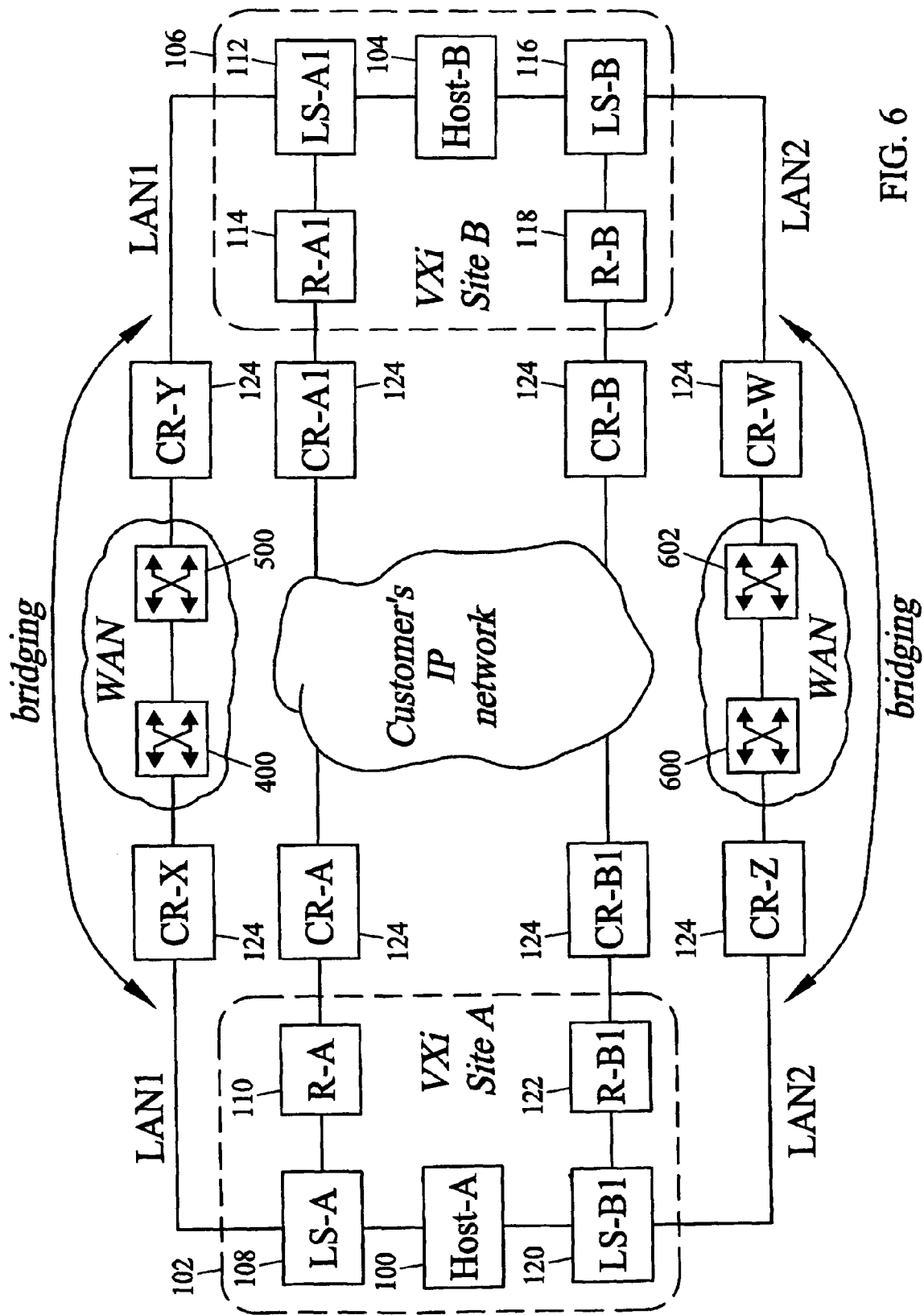
FIG. 6 is a block diagram illustrating bridging using a customer's IP network between geographically separate redundant telephony call processing hosts according to an embodiment of the present invention.

FIG. 6 is a network architecture diagram illustrating interconnection of the redundant telephony call processing hosts using the customer's interconnecting routers and WAN switches as described in FIGS. 4 and 5. Referring to FIG. 6, remote sites 102 and 106 are interconnected via customer routers 124 and WAN switches 400, 500, 600, and 602. In this configuration, customer routers need to be modified in order to perform the bridging.

In alternate implementation, bridging may be performed using an interconnecting customer network; however, the impact on the geographically distributed telephony call processing host is minimized.

Bridging Done in Customer's Equipment (Variant 2)

Figure 7:
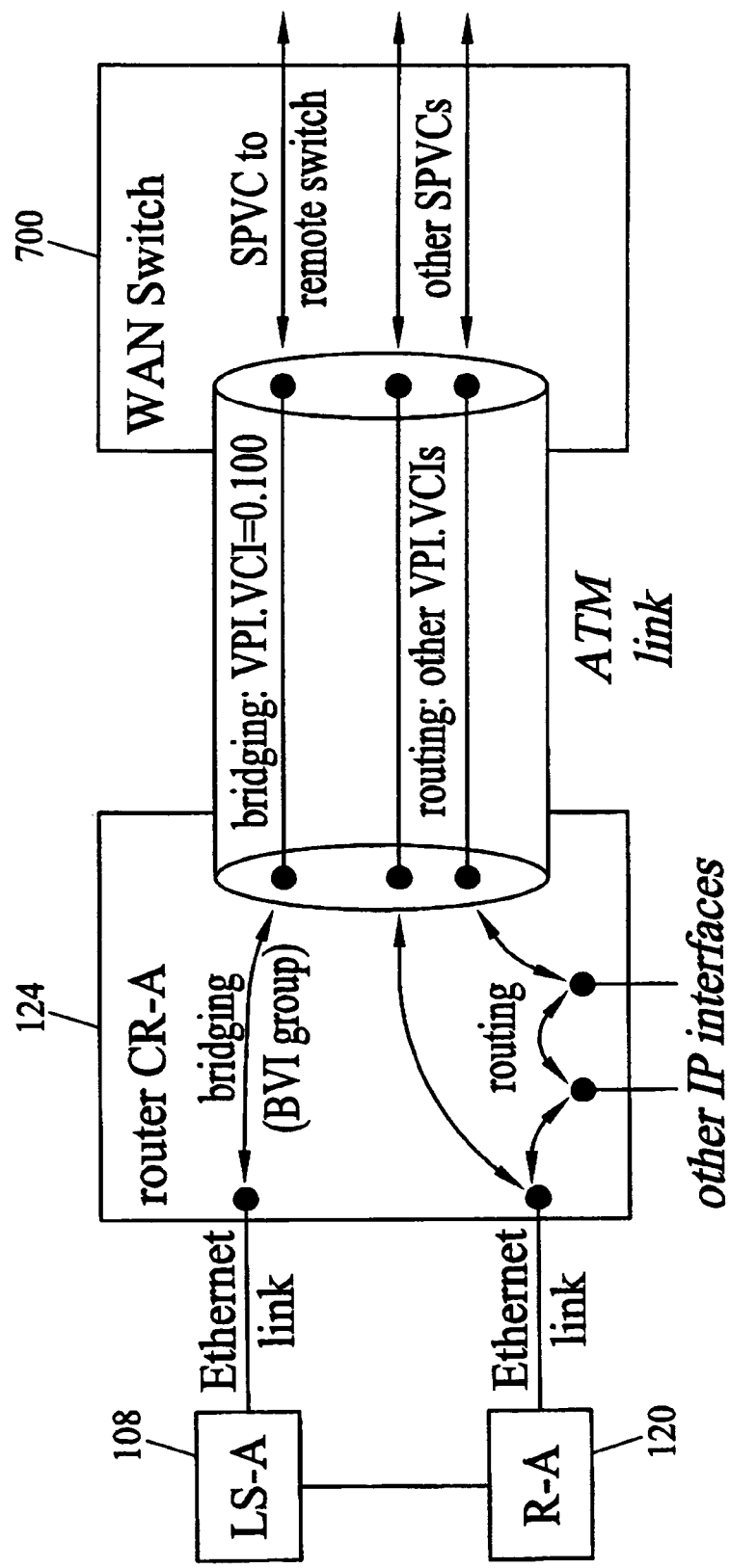
FIG. 7 illustrates another example of bridging in a customer's interconnecting routers between geographically separate redundant telephony call processing hosts according to an embodiment of the present invention.
Figure 8:
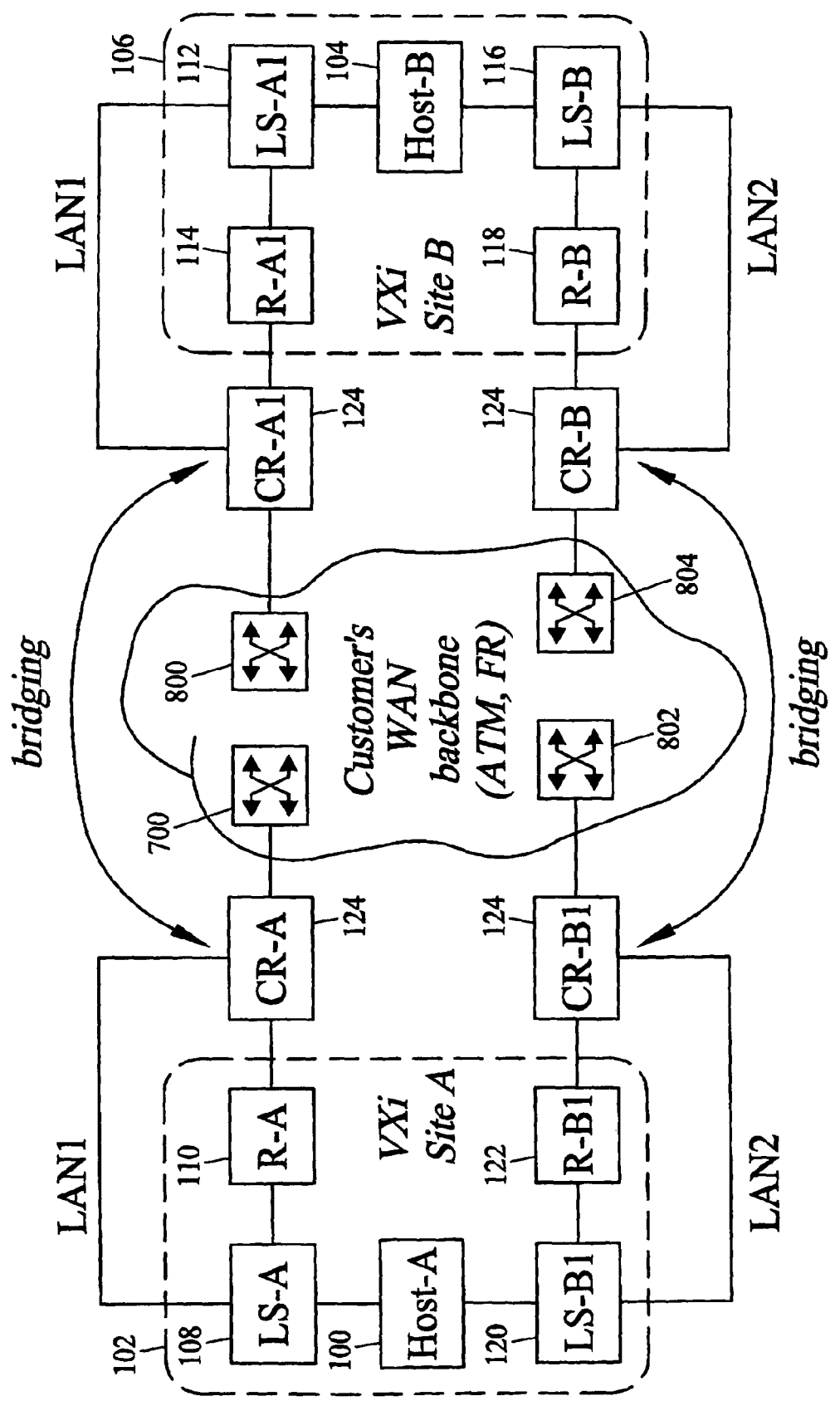
FIG. 8 is a block diagram illustrating bridging in a customer's interconnecting routers to interconnect geographically separate redundant telephony call processing hosts according to an embodiment of the present invention.

In an alternate implementation, redundant telephony call processing hosts may be bridged by sharing the interconnecting WAN with a customer's IP overlay network. FIGS. 7 and 8 illustrate this bridging solution. In FIG. 7, both LAN switch A 108 and router A 120 include Ethernet interfaces that connect with Ethernet interface on customer router A 124. Customer router A 124 interconnects with a LAN switch 700 via an ATM PVC. In FIG. 8, customer router A 124 and customer router A1 124 are interconnected via a WAN bridge implemented by WAN switches 700 and 800. Similarly, customer router B1 and 124 and customer router B 124 are interconnected via a WAN bridge implemented via WAN switches 802 and 804. The difference between the implementation in FIG. 6 and FIG. 8 is that in FIG. 6, separate WAN and IP networks are used to interconnect routers and LAN switches at the remote ends of the connection. In FIG. 8, all routers and LAN switches are interconnected over the same WAN backbone. Thus, the system illustrated in FIG. 8 requires a reduced number of components than the system illustrated in FIG. 6. The solution illustrated in FIG. 8 is suitable when a customer's IP network is an overlay network over an existing WAN backbone.

Bridging Using Isolation Routers

Figure 9:
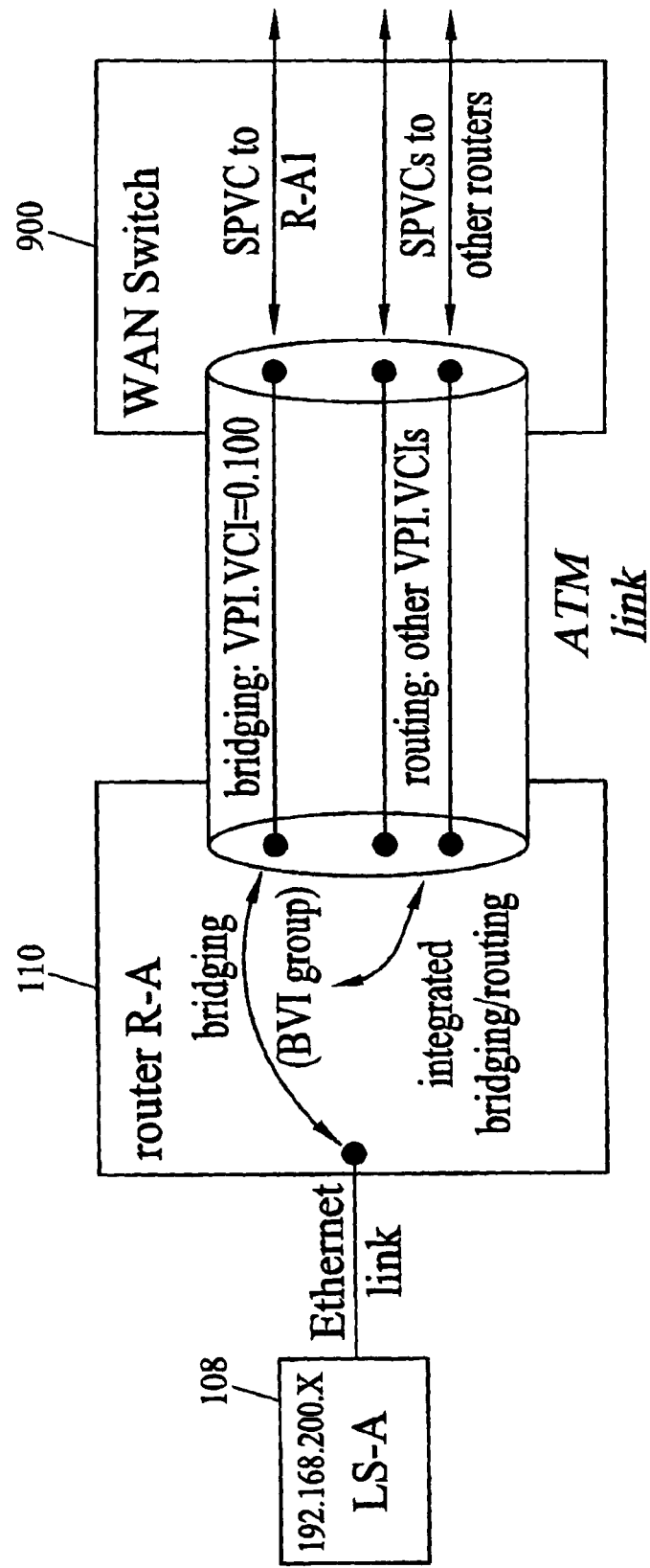
FIG. 9 illustrates exemplary bridging performed in an isolation router between geographically separate redundant telephony call processing hosts according to an embodiment of the present invention.

Instead of using customer backbone equipment to perform bridging between redundant telephony call processing hosts, bridging may be performed in isolation routers (provided by the telephony equipment vendor as part of the solution) used to connect remote sites 102 and 106 to an interconnecting network. FIG. 9 illustrates exemplary bridging performed by isolation routers according to an embodiment of the present invention. In FIG. 9, router A 110 is connected to WAN switch 900 in a customer's network over an ATM or frame relay link, rather than connecting to edge routers in a customer's IP network via Ethernet links as described in the solutions above. In order to implement bridging and isolation routers, integrate bridging and routing must be performed in router A 110, as shown in FIG. 9. This means that incoming traffic on the Ethernet interface of router A 110 if destined for the 192.168.200.x subnet is bridged over VPI.VCI equals 1.100. If the traffic is not destined for this subnet, then it is routed over the other routing interfaces.

Typically, the other routing interfaces denoted as "other VPI.VCIs" in FIG. 9 are SPVCs used as point-to-point links to other routers. These interfaces are similar to the interfaces described above in FIG. 5. Alternately, if WAN switch 900 can perform both switching and routing, then these additional SPVCs are not necessary. A single PVC, for example, 0.101, can be used for routed traffic. This interface constitutes a routed interface on WAN switch 900. Traffic to this interface is not directly relayed to an SPVC. Similar routing considerations may be applied to router A 114, router B 116, and router B1 120 illustrated in FIG. 1. Exemplary isolation routers suitable for implementing the solution illustrated in FIG. 9 are any of the routers available from Cisco Systems, Inc. and/or many other vendors.

Figure 10:
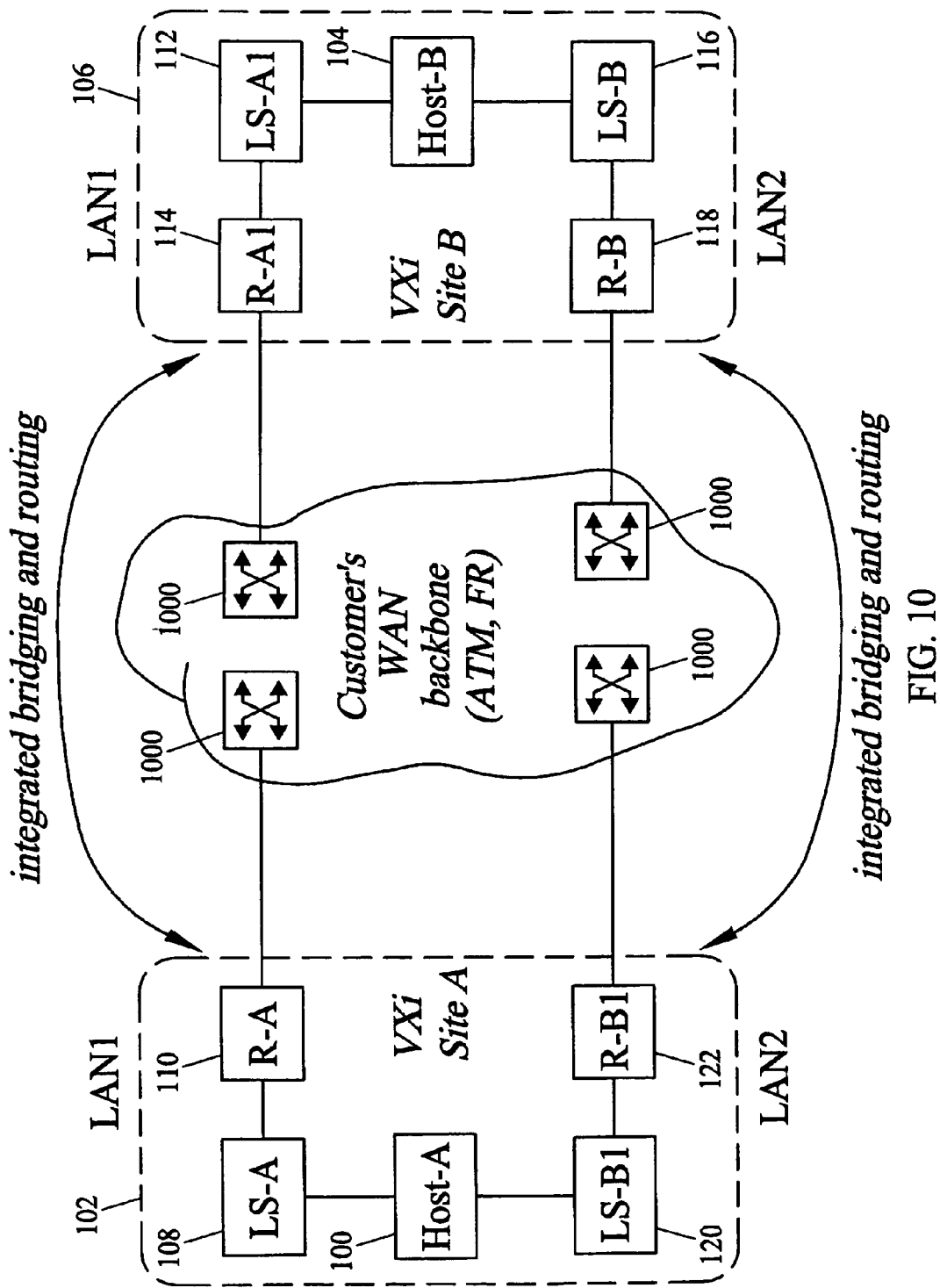
FIG. 10 is a block diagram illustrating bridging performed by isolation routers between geographically separate redundant telephony call processing hosts according to an embodiment of the present invention.

FIG. 10 illustrates an example of bridging using isolation routers according to an embodiment of the present invention. In FIG. 10, bridging is performed using isolation routers 110, 114, 118, and 122. Each isolation router connects to a WAN switch 1000 located in the customer's WAN backbone. Thus, using the illustrated in FIG. 10, bridging can be performed without requiring modification to routers in the customer's IP network.

Network Addressing

In general, IP addressing for network components of a geographically distributed redundant telephony call processing host preferably minimize the IP addresses consumed and the impact on the interconnecting routers. In addition, the IP addressing scheme is preferably easy to implement and transparent to application level software whether site redundancy is utilized or not. In order to implement these addressing rules, a classless addressing scheme using subnetting may be used.

Figure 11:
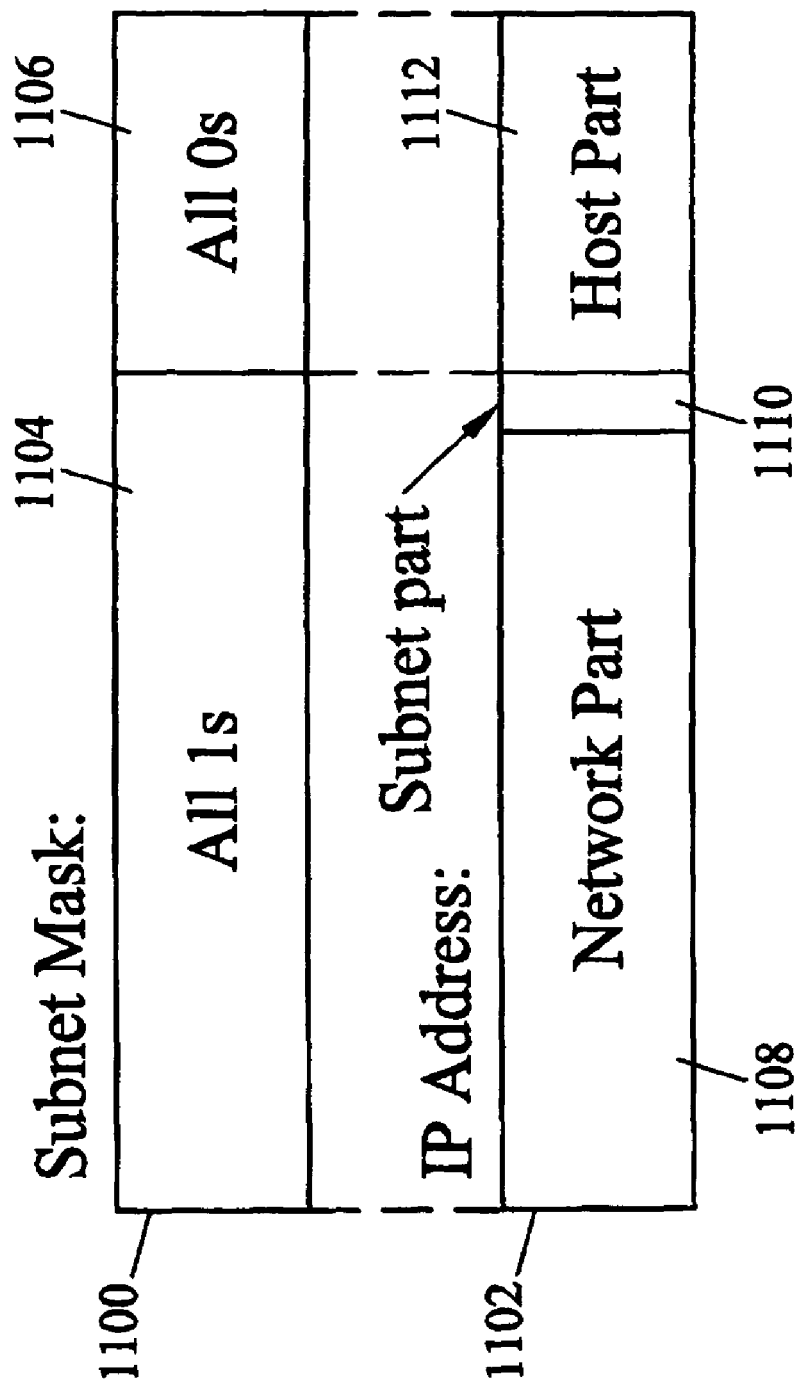
FIG. 11 is a block diagram illustrating conventional subnet masking.

FIG. 11 illustrates conventional subnetting. In FIG. 11, a subnet mask 1100 may be applied to an IP address 1102 in order to implement IP subnetting. More particularly, subnet mask 1100 includes a first portion 1104 consisting of all ones and a second portion 1106 consisting of all zeros. IP address 1102 is divided into a network part 1108, a subnet part 1110, and a host part 1112. Network part 1108 identifies the network to which a packet is addressed. Subnet part 1110 allows a physical network to be divided into multiple subnets. Host part 1112 identifies the host on an individual subnet. Subnet mask 1100 is AND with destination IP addresses in incoming packets and compared with the corresponding entries to determine a next top address for the incoming packet.

Figure 12:
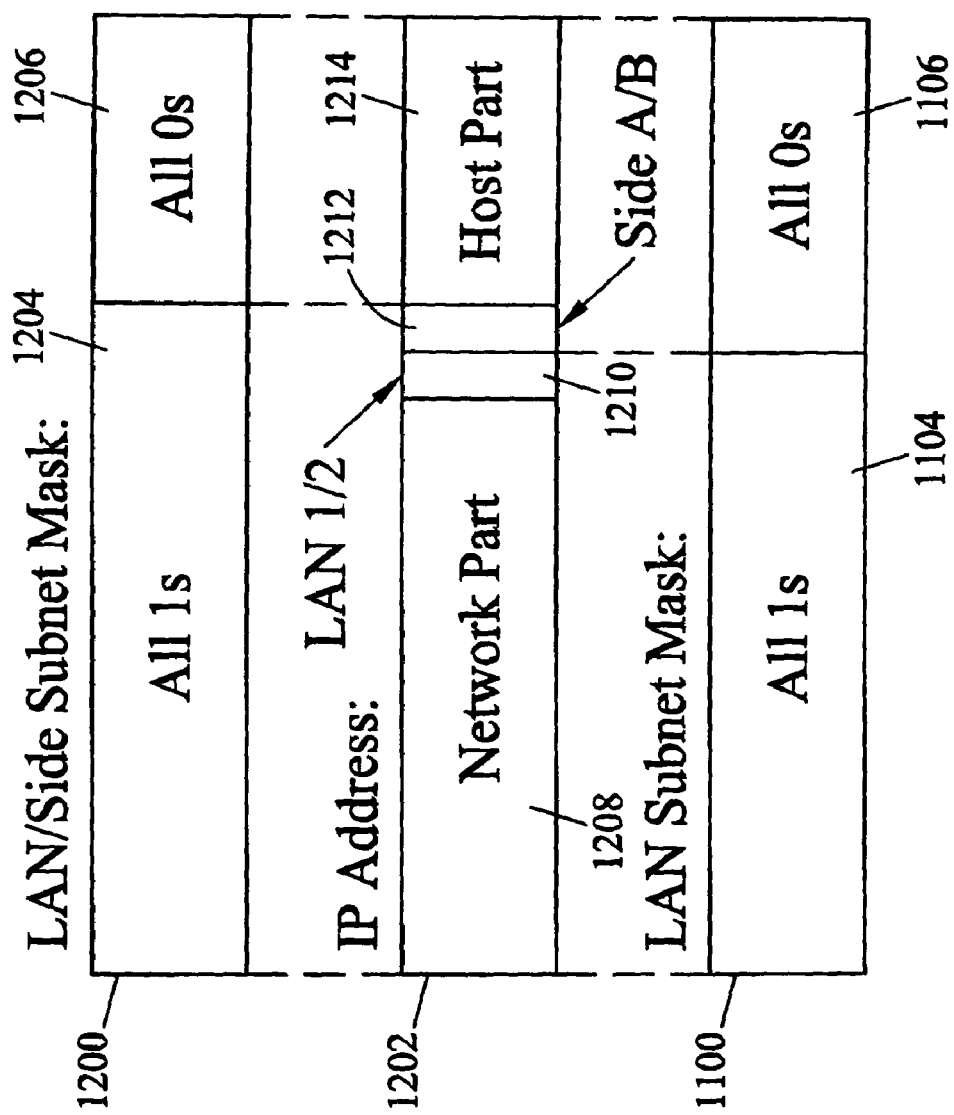
FIG. 12 is a block diagram illustrating exemplary LAN/side subnet masking performed in isolation routers that interconnect geographically separate redundant telephony call processing hosts according to an embodiment of the present invention.

While conventional subnetting allows IP addresses to include a network part and a subnet part, the present invention exemplifies an application-specific addressing schema that allows IP addresses to include a network part, a LAN part, and a side part. FIG. 12 illustrates LAN/side subnetting according to the present invention. In FIG. 12, a LAN/side subnet mask 1200 is applied to an IP address 1202 when comparing the IP address to routing table entries. LAN/side subnet mask 1200 includes a first portion 1204 that is all ones and a second portion 1206 that is all zeros used to mask out the host part of the IP address. Such a mask allows IP address 1202 to include a network part 1208, a LAN part 1210, a side part 1212, and a host part 1214. Network part 1208 identifies the IP network, as subnet masks. LAN part 1210 identifies the LAN of a redundant telephony call processing host. Side part 1212 identifies the side, i.e., A or B of the LAN. Host part 1214 identifies the particular host on the particular LAN/side.

LAN subnet mask 1100 is also required in the exemplary implementation of redundant telephony call processing hosts as described herein. LAN subnet mask 1100 is used to distinguish between internal LAN subnets 1 and 2. LAN/side subnet mask 1200 is used to distinguish among the four combinations of the two LANs and the two sides. The two types of addressing are represented by one bit each in the subnet mask. When used together, the two bits allow discrimination between four quadrants of the overall redundant telephony call processor address space: LAN 1/side A, LAN 1/side B, LAN 2/side A, and LAN 2/side B.

Either of the subnet masks illustrated in FIG. 12 may be used for routing, depending on the network configuration. For example, the LAN/side subnet mask may be used in the customer's network routers to allow four way routing in the site redundancy case while the LAN subnet mask may be used to allow two way routing in a standard single site case.

Two address spaces, each consisting of for example 64 continuous addresses may be reserved for implementing site redundancy according to the present invention. Reserving 64 addresses allows for a maximum of 62 addresses on each of two LAN subnets (addresses with all ones or all zeros are not allowed). A host part address consists of a minimum five bit component plus a one bit side or site A/B indicator. For the indicator bit, a value of zero may indicate side A and a value of one may indicate side B. The two address spaces need not be contiguous with each other. However, each range of 64 addresses is preferably on a multiple of 64 boundary (e.g.: 0, 64, 128, etc.) Within these ranges the corresponding side A and B components will have addresses that are offset by 32 from each other. The number 64 is provided here as an example only. The actual number depends on the total number of IP addresses required by the telephony node as well as by all the additional equipment hosted on the two LANs.

IP Addressing Rules

Exemplary rules for two LAN based addresses and two subnet masks may be as follows:

1. For LAN 1, select a base address on an even boundary of 64, considering the entire 32-bit IP address to guarantee that the right most six bits are zeroes.
2. For LAN 2, select a base address on an even boundary of 64, and that is greater than the base address of LAN 1 (this is to make sure that it is different than the LAN 1 value, and by convention will always be known to be greater).
3. Express each LAN base address as XXX.XXX.XXX.XXX, where XXX is a decimal number between 0 and 255.
4. Convert each of the addresses to a 32-bit binary number, find the right-most (low-order) 1-bit in either address.

TABLE 1

| Subnet Mask Byte Values | | | | | | | | |
|---|---|---|---|---|---|---|---|---|
| 128 | 64 | 32 | 16 | 8 | 4 | 2 | 1 | Byte Value |
| 1 | 0 | 0 | 0 | 0 | 0 | 0 | 0 | =128 |
| 1 | 1 | 0 | 0 | 0 | 0 | 0 | 0 | =192 |
| 1 | 1 | 1 | 0 | 0 | 0 | 0 | 0 | =224 |
| 1 | 1 | 1 | 1 | 0 | 0 | 0 | 0 | =240 |
| 1 | 1 | 1 | 1 | 1 | 0 | 0 | 0 | =248 |
| 1 | 1 | 1 | 1 | 1 | 1 | 0 | 0 | =252 |
| 1 | 1 | 1 | 1 | 1 | 1 | 1 | 0 | =254 |
| 1 | 1 | 1 | 1 | 1 | 1 | 1 | 1 | =255 |

5. To define the LAN subnet mask: for the byte in which the right-most 1-bit occurs, use Table 1 to select the decimal value for that byte. For example, if the right-most bit occurs in the "32" column, use the byte value of 224 for that byte. All bytes to the left of this byte will have a value of 255 (all 1 bits) and all bytes to the right will have a value of 0 (all 0 bits).
6. To define the LAN/side subnet mask: note that the base address of the A-side of each LAN is the same as the LAN base address and the B-side of each LAN is equal to the LAN base address plus 32. This means that the right-most bit of the base address is always in the "32" column of the right-most byte, so the byte value is always 224. As for the LAN subnet mask, all bytes to the left are 255.

For example, assume the LAN 1 base address is chosen as 192.168.200.0 and the LAN 2 base address is chosen as 192.168.200.64. the binary equivalents are: 11000000.10101000.11001000.00000000 and 11000000.10101000.11001000.01000000. The right-most 1-bit is in the "64" column, so the byte value is 192. The LAN subnet mask is 255.255.255.192, and the LAN/side subnet mask is 255.255.255.224.

As an additional example, consider the case where in a site redundancy lab trial, a customer desires to use an existing set of network addresses with subnets identified as 172.25.216.0 and 172.25.217.0. These correspond to the LAN 1 and 2 base addresses, respectively. Using the subnet selection rules, the right-most 1-bit is in the LAN 2 address byte with a value of 217 (the binary for the whole address=10101100.00011001.11011001.00000000). Therefore the value from the table for the "1" column for this byte is 255, so the LAN selection subnet mask is 255.255.255.0. The side A/B subnet mask is 255.255.255.224.

Exemplary Addressing Scheme

An exemplary addressing scheme suitable for use with embodiments of the present invention is shown in Table 2. The given offsets are from the base address for each of LAN subnets, where each base address is a multiple of 64 from 0 to 192, and the LAN 2 base address is larger than the LAN 1 base address. Devices used only in the site-redundancy configuration are shown in bold font. Addresses not explicitly defined are reserved for future use. In Table 2 and below, "VXi" and SXi" are trademarks that the assignee of the present invention uses for MGC and SIP call processing hosts. "IP7 SG" is a trademark that the assignee of the present invention uses for an SS7/IP signaling gateway.

TABLE 2

IP Addressing Device Offsets

| Side | Device Offset | LAN 1 Device (interface) | LAN 2 Device (interface) |
|---|---|---|---|
| A | 1 | VXi Host A (hme0) | VXi Host A (qfe0) |
|   | 2 | VXi Active Host (VIP1) | |
|   | 3 | TAS A | |
|   | 4 | | |
|   | 5 | Isolation Router A (0/0)[a] | Isolation Router B1 (0/0) |
|   | 6 | Dial-in Router A (0/0) | Dial-in Router A (0/1) |
|   | 7 | | |
|   | 8 | IP7 SG Front End (dcm-1)[b] | IP7 SG Front End (dcm-2) |
|   | 9 | | |
|   | 10 | VXi Workstation A | |
|   | 11 | | |
|   | 12 | SXi Host A (hme0)[c] | SXi Host A (qfe0) |
|   | 13 | SXi Host B (hme0) | SXi Host B (qfe0) |
|   | 14 | | |
|   | 15 | | |
|   | 16-31 | | |
| B | 32 | | |
|   | 33 | VXi Host B (hme0) | VXi Host B (qfe0) |
|   | 34 | | VXi Active Host (VIP2) |
|   | 35 | | TAS B |
|   | 36 | | |
|   | 37 | Isolation Router A1 (0/0) | Isolation Router B (0/0) |
|   | 38 | Dial-in Router B (0/0) | Dial-in Router B (0/1) |
|   | 39 | | |
|   | 40 | IP7 SG Front End (dcm-3) | IP7 Front End (dcm-4) |

TABLE 2-continued

IP Addressing Device Offsets

| Side | Device Offset | LAN 1 Device (interface) | LAN 2 Device (interface) |
|---|---|---|---|
| | 41 | | |
| | 42 | | VXi Workstation B |
| | 43 | | |
| | 44 | SXi Host A1 (hme0) | SXi Host A1 (qfe0) |
| | 45 | SXi Host B1 (hme0) | SXi Host B1 (qfe0) |
| | 46 | | |
| | 47 | | |
| | 48-62 | | |

VXi MGC Default IP Addresses

Default address assignments have been chosen to meet the above requirements; these addresses may have the following characteristics:

A class C network address is used; i.e., the high-order bits are "110". The standard network part of the address is 192.168.200.0.

The base addresses for the LANs are as shown in Table 3:

TABLE 3

VXi Default LAN Base Addresses

| LAN | Base IP Address |
|---|---|
| 1 | 192.168.200.0 |
| 2 | 192.168.200.64 |

Device on LAN 1 have host addresses from 1-62, while devices on LAN 2 have host addresses from 65-126 (base address of 64 plus offsets of 1-62). Where there are corresponding devices on both subnets, their addresses differ by 64, while side A and B devices on a given LAN subnet differ by 32.

For the site redundancy configuration, the four quadrants of the IP addresses have base addresses as shown in Table 4:

TABLE 4

VXi Default Site Redundancy Base Addresses

| LAN | Side | Base IP Address |
|---|---|---|
| 1 | A | 192.168.200.0 |
|   | B | 192.168.200.32 |
| 2 | A | 192.168.200.64 |
|   | B | 192.168.200.96 |

The default LAN subnet mask is 255.255.255.192 (this value can change according to the needs of the customer's network).

The default LAN/Side subnet mask is 255.255.255.224 (this will always be the value of this subnet mask as long as the six-bit host address is part is used).

The default device addresses using this scheme for the VXi MGC network components are shown in Table 5 (devices shown in bold are present only in the Site Redundancy configuration).

TABLE 5

Factory Default IP Addresses

| Side | Device IP | Subnet 1 Device (interface) | | Subnet2 Device (interface) |
|---|---|---|---|---|
| A | 192.168.200.1 | VXi Host A(hme0) | 192.168.200.65 | |
| | 192.168.200.2 | VXi Active Host (VIP1) | 192.168.200.66 | |
| | 192.168.200.3 | TAS A | 192.168.200.67 | |
| | 192.168.200.4 | | 192.168.200.68 | |
| | 192.168.200.5 | Isolation Router A (0/) | 192.168.200.69 | |
| | 192.168.200.6 | Dial-In Router A (0/0) | 192.168.200.70 | |
| | 192.168.200.7 | | 192.168.200.71 | |
| | 192.168.200.8 | IP7 SG Front End (dcm-1) | 192.168.200.72 | |
| | 192.168.200.9 | | 192.168.200.73 | |
| | 192.168.200.10 | VXi Workstation A | 192.168.200.74 | |
| | 192.168.200.11 | | 192.168.200.75 | |
| | 192.168.200.12 | SXi Host A (hme0) | 192.168.200.76 | |
| | 192.168.200.13 | SXi Host B (hme0) | 192.168.200.77 | |
| | 192.168.200.14 | | 192.168.200.78 | |
| | 192.168.200.15 | | 192.168.200. | |
| | 192.168.200.16-31 | | 192.168.200.79-95 | |
| B | 192.168.200.32 | | 192.168.200.96 | |
| | 192.168.200.33 | VXi Host B (hme0) | 192.168.200.97 | VXi Host B (qfe0) |
| | 192.168.200.34 | | 192.168.200.98 | VXi Active Host (VIP2) |
| | 192.168.200.35 | | 192.168.200.99 | TAS B |
| | 192.168.200.36 | | 192.168.200.100 | |
| | 192.168.200.37 | Isolation Router A1 (0/0) | 192.168.200.101 | Isolation Router B (0/0) |
| | 192.168.200.38 | Dial-in Router B (0/0) | 192.168.200.102 | Dial-in Router B (0/1) |
| | 192.168.200.39 | | 192.168.200.103 | |
| | 192.168.200.40 | IP7 SG Front End (dcm-3) | 192.168.200.104 | IP7 Front End (dcm-4) |
| | 192.168.200.41 | | 192.168.200.105 | |
| | 192.168.200.42 | | 192.168.200.106 | VXi Workstation B |
| | 192.168.200.43 | | 192.168.200.107 | |
| | 192.168.200.44 | SXi Host A1 (hme0) | 192.168.200.108 | SXi Host A1 (qfe0) |
| | 192.168.200.45 | SXi Host B1 (hme0) | 192.168.200.109 | SXi Host B1 (qfe0) |
| | 192.168.200.46-47 | | 192.168.200.110 | |
| | 192.168.200.48-62 | | 192.168.200.111 | |
| | | | 192.168.200.112-126 | |

Figure 13:
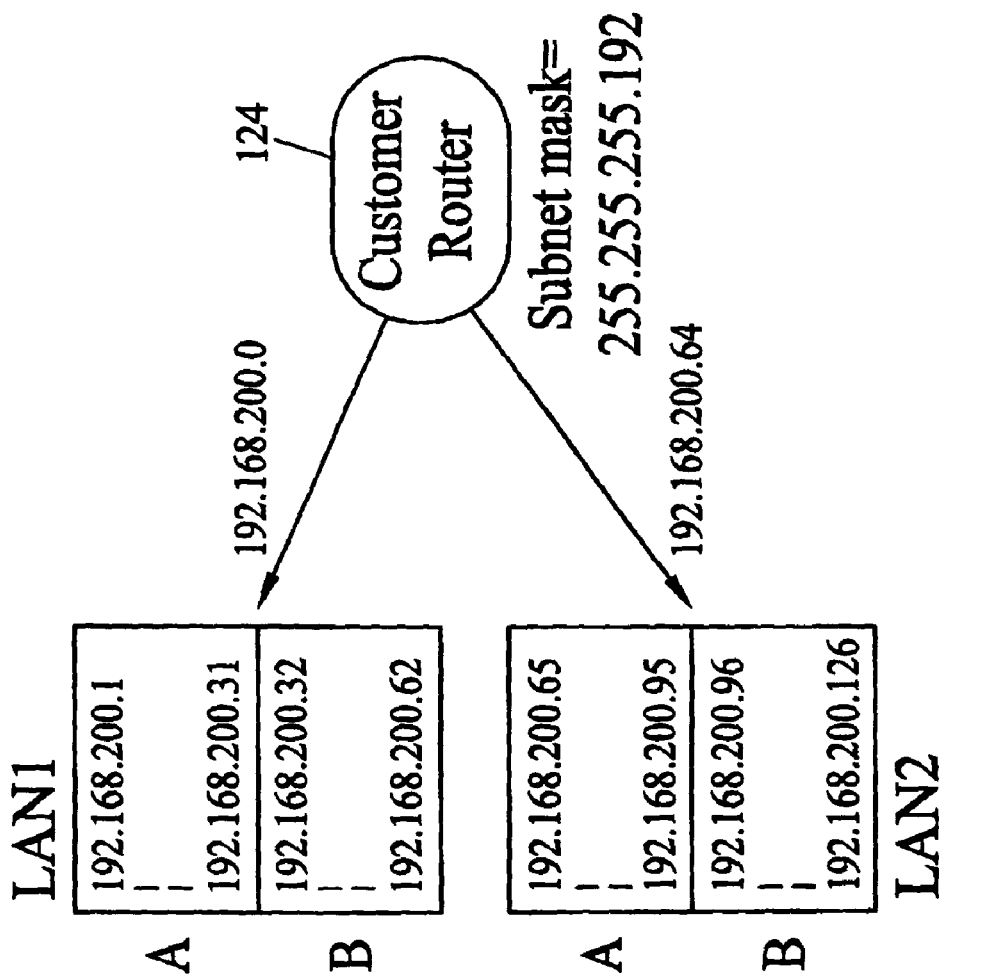
FIG. 13 is a block diagram illustrating exemplary routing assuming standard subnet masking.
Figure 14:
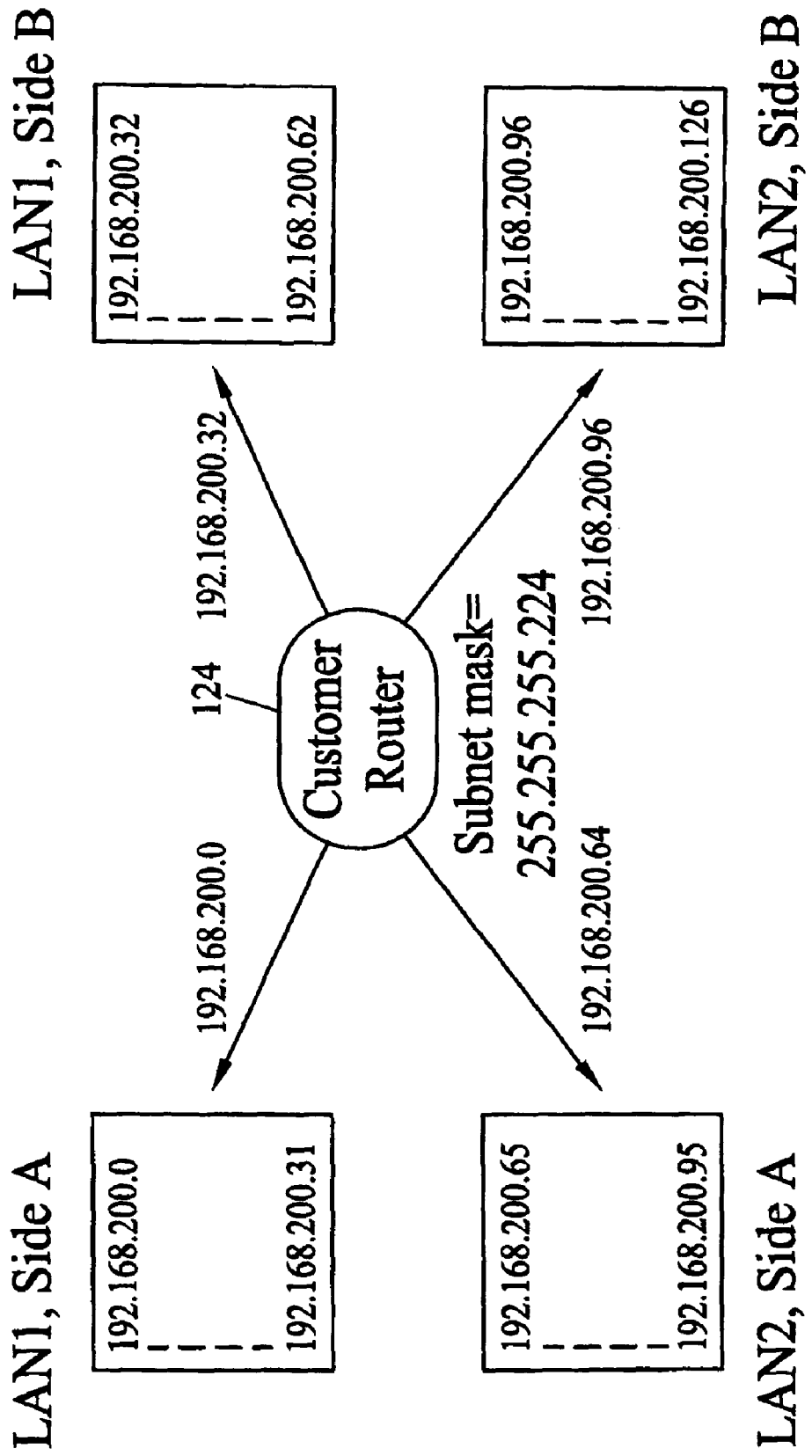
FIG. 14 is a block diagram illustrating exemplary customer routing assuming LAN/side subnet masking and site redundancy between telephony call processing hosts according to an embodiment of the present invention.

FIGS. 13 and 14 illustrate how subnet routing works with the default addressing scheme. FIG. 13 shows the non-site redundant case, in which the customer's router distinguishes between the VXi internal LANs based on the LAN subnet mask. FIG. 14 shows the site redundancy case, in which the customer's router distinguishes among the four combinations of LAN 1 and 2, side A and B, using the LAN/Side subnet mask. In both cases the logical AND of the router's subnet mask and an incoming packet's IP address will give a network number corresponding to one of the router's output ports, as shown.

Although the examples described above illustrate splitting a redundant telephony call processor into geographically separate locations, the present invention is not limited to such an embodiment. In an alternate embodiment or implementation, an additional half node may be provided for 2n+1 redundancy. The half node may be co-located with one of the telephony call processing hosts or geographically separate from all of the telephony call processing hosts. The half node is preferably capable of detecting failure of any of the telephony call processing hosts and taking over the operations of any of the telephony call processing hosts. Such redundancy provides a cost advantage over providing full redundancy at each location.

Thus, the present invention includes methods and systems for providing redundant call processing hosts in geographically separate locations. Providing such hosts in geographically separate locations increases reliability and decreases susceptibility to network wide failures. Exemplary schemes for interconnecting the redundant sites include bridging using a customer's IP network, and bridging using a separate customer WAN. An addressing scheme allows differentiation between LANs and sides of a redundant telephony call processing network architecture.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A multi-site redundant telephony call processing system comprising:
   (a) an active telephony call processing host located in a first geographic region for controlling calls between telephony subscribers;
   (b) a standby telephony call processing host located in a second geographic region remote from the first geographic region for taking over call control functions handled by the active telephony call processing host in response to failure of the active telephony call processing host, the active and standby call processing hosts forming a single logical telephony call processing node;
   (c) a first local area network (LAN) including a first LAN segment and a second LAN segment being geographically distributed between the first and second geographic regions for carrying signaling messages to and from the active and standby telephony call processing hosts, wherein the first LAN is bridged over a wide area network (WAN) by interconnecting the first LAN segment located in the first geographic region with the second LAN segment located in the second geographic region using first and second routers that implement transparent bridging over the WAN; and (d) a second LAN including a first LAN segment located in the first geographic region and a second LAN segment located in the second geographic region, wherein the second LAN is a redundant LAN with respect to the first LAN, and wherein each of the first LAN and the second LAN respectively includes a single IP subnet, and wherein the active telephony call processing host is connected to both the first segment of the first LAN in the first geographic region and the first segment of the second LAN in the first geographic region and the standby telephony call processing host is connected to both the second segment of the first LAN in the second geographic region and the second segment of the second LAN in the second geographic region.

2. The system of claim 1 wherein the telephony call processing hosts comprise active and standby packet telephony call processing hosts.

3. The system of claim 2 wherein the packet telephony call processing hosts comprise active and standby media gateway controllers.

4. The system of claim 2 wherein the packet telephony call processing hosts comprise active and standby SIP proxy servers.

5. The system of claim 2 wherein the packet telephony call processing hosts comprise active and standby H.323 gatekeepers.

6. The system of claim 1 wherein the telephony call processing hosts comprise active and standby telephony feature servers.

7. The system of claim 1 wherein the telephony call processing hosts comprise active and standby telephony application servers.

8. A redundant telephony call processing system comprising:

(a) N dual host telephony call processing nodes, N being an integer, each dual host telephony call processing node including first and second telephony call processing half nodes, each half node including a single host, the half-nodes being located in different geographic locations, wherein a first local area network (LAN) including a first LAN segment and a second LAN segment is geographically distributed between the different geographic locations and a second LAN including a first LAN segment and a second LAN segment is geographically distributed between the different geographic locations, and wherein the first LAN is bridged over a wide area network (WAN) by interconnecting the first LAN segment of the first LAN located in a first geographic location with the second LAN segment of the first LAN located in a second geographic region using first and second routers that implement transparent bridging over the WAN, and wherein the second LAN is bridged over the WAN by interconnecting the first LAN segment of the second LAN located in the first geographic location with the second LAN segment of the second LAN located in the second geographic region, and wherein each of the first LAN and second LAN includes a single IP subnet, and wherein the first telephony call processing half-node is connected to both the first LAN segment of the first LAN in the first geographic region and the first LAN segment of the second LAN in the first geographic region and the second telephony call processing half-node is connected to both the second LAN segment of the first LAN in the second geographic region and the second LAN segment of the second LAN in the second geographic region; and (b) a third telephony call processing half-node operatively associated with the first and second telephony call processing half-nodes and capable of taking over the operations of any of the first and second telephony call processing half-nodes in response to failure of any of the first and second telephony call processing half nodes.

9. The system of claim 8 wherein the third telephony call processing half-node is geographically separated from the first and second telephony call processing half nodes.

10. The system of claim 8 wherein the third telephony call processing half node is co-located with one of the first and second telephony call processing half nodes.

11. The system of claim 8 wherein the telephony call processing half nodes comprise media gateway controllers.

12. The system of claim 8 wherein the telephony call processing half nodes comprise SIP proxy servers.

13. The system of claim 8 wherein the telephony call processing half nodes comprise H.323 gatekeepers.

14. The system of claim 8 wherein the telephony call processing half nodes comprise telephony feature servers.

15. A method for routing packets between geographically separate redundant telephony call processing hosts, the method comprising:

(a) receiving a packet addressed to one of a plurality of geographically separate redundant telephony call processing hosts, wherein the plurality of geographically separate redundant telephony call processing hosts includes a first telephony call processing host and a second telephony call processing host;

(b) extracting a destination network address from the packet;

(c) applying a LAN/side subnet mask to the destination network address;

(d) comparing the masked address from step (c) to a plurality of different routing table entries to identify either a first geographically distributed LAN including a first LAN side located in a first geographic region and a second LAN side located in a second geographic region bridged over a wide area network (WAN) using first and second routers that implement transparent bridging over the WAN or a second geographically distributed LAN including a first LAN side located in the first geographic region and a second LAN side located in the second geographic region bridged over the WAN using third and fourth routers that implement transparent bridging over the WAN and either the first LAN side or the second LAN side of the identified first or second geographically distributed LAN to which the packet should be routed, wherein each of the first geographically distributed LAN and second geographically distributed LAN includes a single IP subnet, and wherein the first telephony call processing host is connected to both the first LAN side of the first geographically distributed LAN in the first geographic region and the first LAN side of the second geographically distributed LAN in the first geographic region and the second telephony call processing host is connected to both the second LAN side of the first geographically distributed LAN in the second geographic region and the second LAN side of the second geographically distributed LAN in the second geographic region; and (e) routing the packet to the LAN/side combination identified in step (d).

16. A method for allocating network addresses and subnet masks to a pair of geographically separate telephony call processing hosts, the method comprising:

(a) selecting first and second base network addresses for first and second geographically separate sides of a first LAN, bridged over a wide area network (WAN) by interconnecting the first geographically separate side of the first LAN located in a first geographic region and the second geographically separate side of the first LAN located in a second geographic region using first and second routers that implement transparent bridging over the WAN, for communicating messages between a pair of redundant geographically separate telephony call processing hosts, wherein the first and second geographically separate sides of the first LAN form a single IP subnet, wherein the pair of redundant geographically separate telephony call processing hosts includes a first telephony call processing host and a second telephony call processing host;

(b) selecting second and third base network addresses for first and second geographically separate sides of a second LAN bridged over the WAN by interconnecting the first geographically separate side of the second LAN located in the first geographic region and the second geographically separate side of the second LAN located in the second geographic region for communicating messages between the pair of redundant geographically separate telephony call processing hosts, wherein each of the first LAN and the second LAN includes a single IP subnet, and wherein the second LAN is a redundant LAN with respect to the first LAN, and wherein the first telephony call processing host is connected to both a first segment of the first LAN in the first geographically separate side and a first segment of the second LAN in the first geographically separate side and the second telephony call processing host is connected to both a second segment of the first LAN in the second geographically separate side and a second segment of the second LAN in the second geographically separate side;

(c) converting the base addresses into binary format; and (d) selecting a LAN/side subnet mask to be applied to packets routed between the first and second LANs based on the least significant 1 bit in the base addresses.

* * * * *